US012571778B2

(12) United States Patent
Seo et al.

(10) Patent No.: US 12,571,778 B2
(45) Date of Patent: Mar. 10, 2026

(54) METHOD FOR ANALYZING DEUTERATED COMPOUNDS, METHOD FOR SELECTING DEUTERATED COMPOUND FOR MANUFACTURING DEVICE, AND METHOD FOR MANUFACTURING ELECTRONIC DEVICE

(71) Applicant: LG Chem, Ltd., Seoul (KR)

(72) Inventors: Kiho Seo, Daejeon (KR); Byung Hyun Park, Daejeon (KR); Byoung Hyoun Kim, Daejeon (KR); Su Youn Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 747 days.

(21) Appl. No.: 17/801,998

(22) PCT Filed: Aug. 3, 2021

(86) PCT No.: PCT/KR2021/010127

§ 371 (c)(1),
(2) Date: Aug. 24, 2022

(87) PCT Pub. No.: WO2022/030940

PCT Pub. Date: Feb. 10, 2022

(65) Prior Publication Data

US 2023/0093912 A1 Mar. 30, 2023

(30) Foreign Application Priority Data

Aug. 5, 2020 (KR) ........................ 10-2020-0098125

(51) Int. Cl.
*G01N 30/02* (2006.01)
*G01N 24/08* (2006.01)
*G01N 30/88* (2006.01)

(52) U.S. Cl.
CPC ............. *G01N 30/02* (2013.01); *G01N 24/08* (2013.01); *G01N 2030/027* (2013.01); *G01N 2030/8859* (2013.01); *G01N 2030/8868* (2013.01)

(58) Field of Classification Search
None
See application file for complete search history.

(56) References Cited

U.S. PATENT DOCUMENTS

| | | | |
|---|---|---|---|
| 5,401,664 A | 3/1995 | Larson et al. | |
| 2012/0089342 A1* | 4/2012 | Wright | G01N 30/8644 702/23 |
| 2013/0071867 A1 | 3/2013 | Fadgen | |

(Continued)

FOREIGN PATENT DOCUMENTS

| | | |
|---|---|---|
| JP | H07146284 A | 6/1995 |
| JP | 2006023137 A | 1/2006 |
| JP | 2007205745 A | 8/2007 |

(Continued)

OTHER PUBLICATIONS

International Search Report for Application No. PCT/KR2021/010127 mailed Dec. 6, 2021, pp. 1-4.

*Primary Examiner* — Peter Keyworth
(74) *Attorney, Agent, or Firm* — Lerner David LLP

(57) ABSTRACT

The present specification relates to a method for analyzing a deuterated compound by chromatography, and manufacturing an organic light emitting device using a deuterated compound selected based on the analyzed data.

7 Claims, 4 Drawing Sheets

(56) References Cited

U.S. PATENT DOCUMENTS

2013/0119355 A1 5/2013 Han et al.

FOREIGN PATENT DOCUMENTS

| | | | |
|---|---|---|---|
| JP | 2010256104 | A | 11/2010 |
| JP | 2011504596 | A | 2/2011 |
| JP | 2013501218 | A | 1/2013 |
| KR | 20130051807 | A | 5/2013 |
| KR | 20140058291 | A | 5/2014 |
| KR | 20140144643 | A | 12/2014 |
| KR | 20170025869 | A | 3/2017 |
| WO | 2009070233 | A1 | 6/2009 |

* cited by examiner

【FIG. 1】
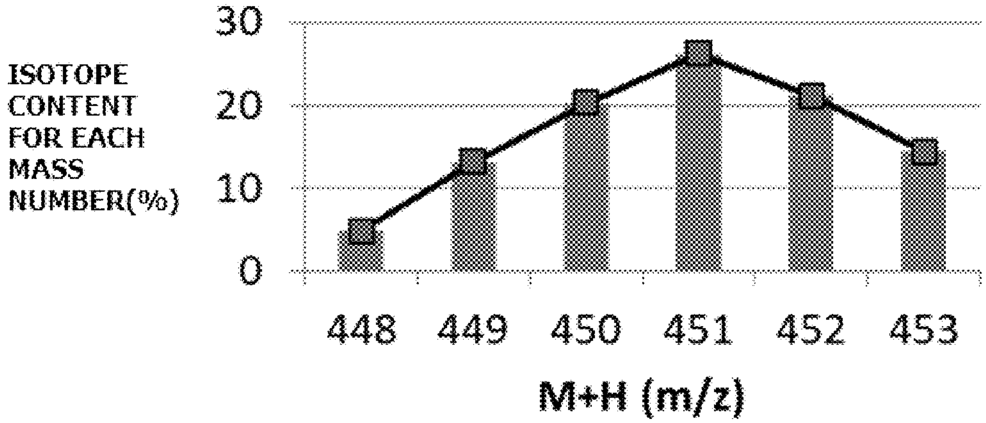
【FIG. 2】
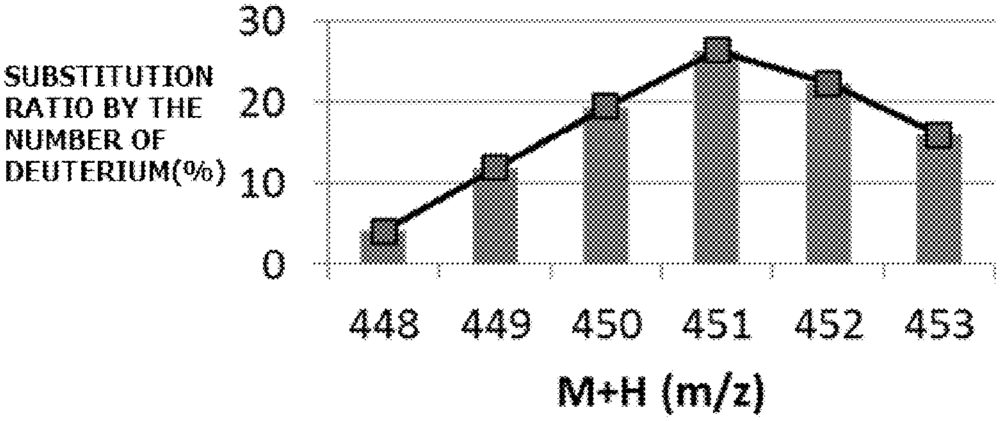

【FIG. 3】
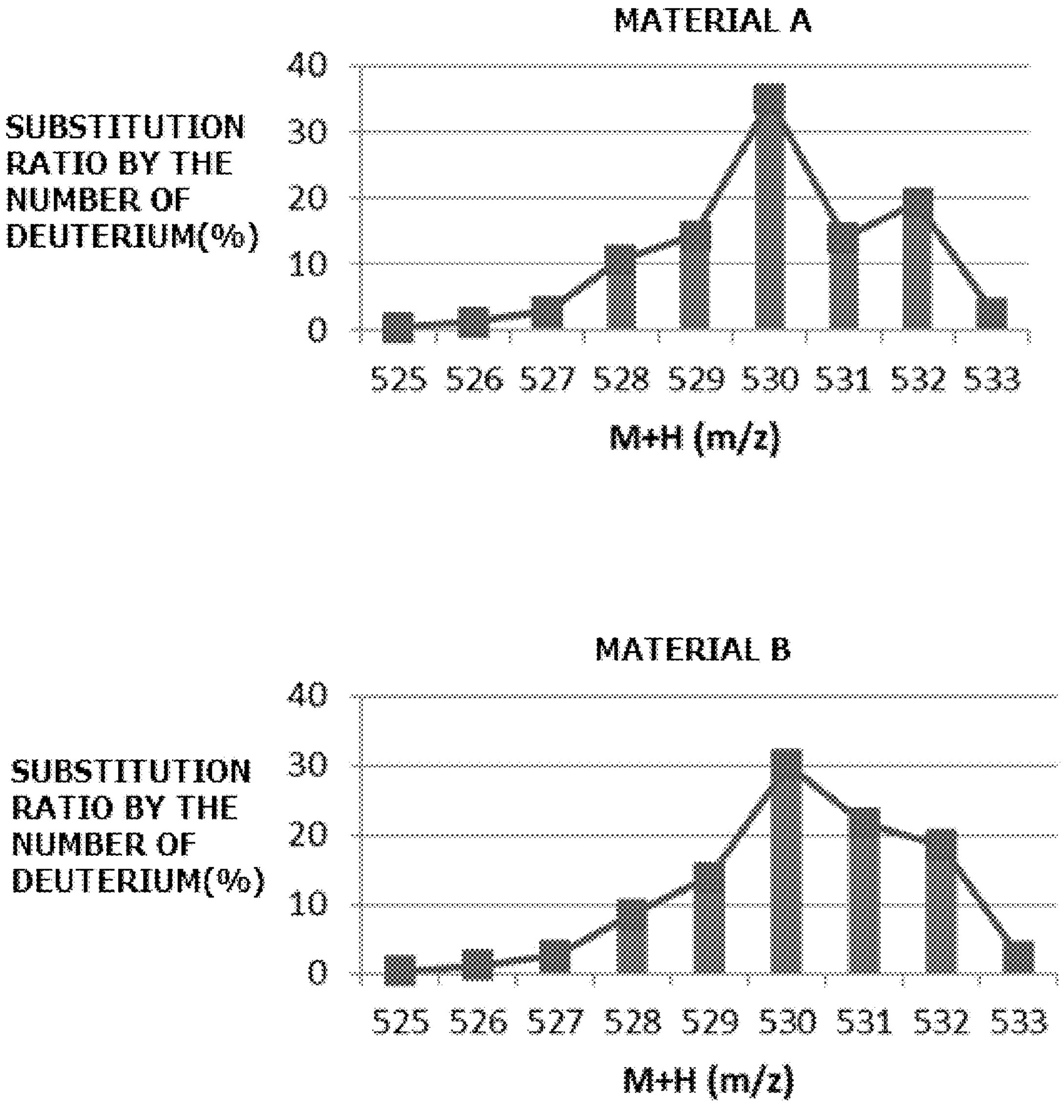

【FIG. 4】
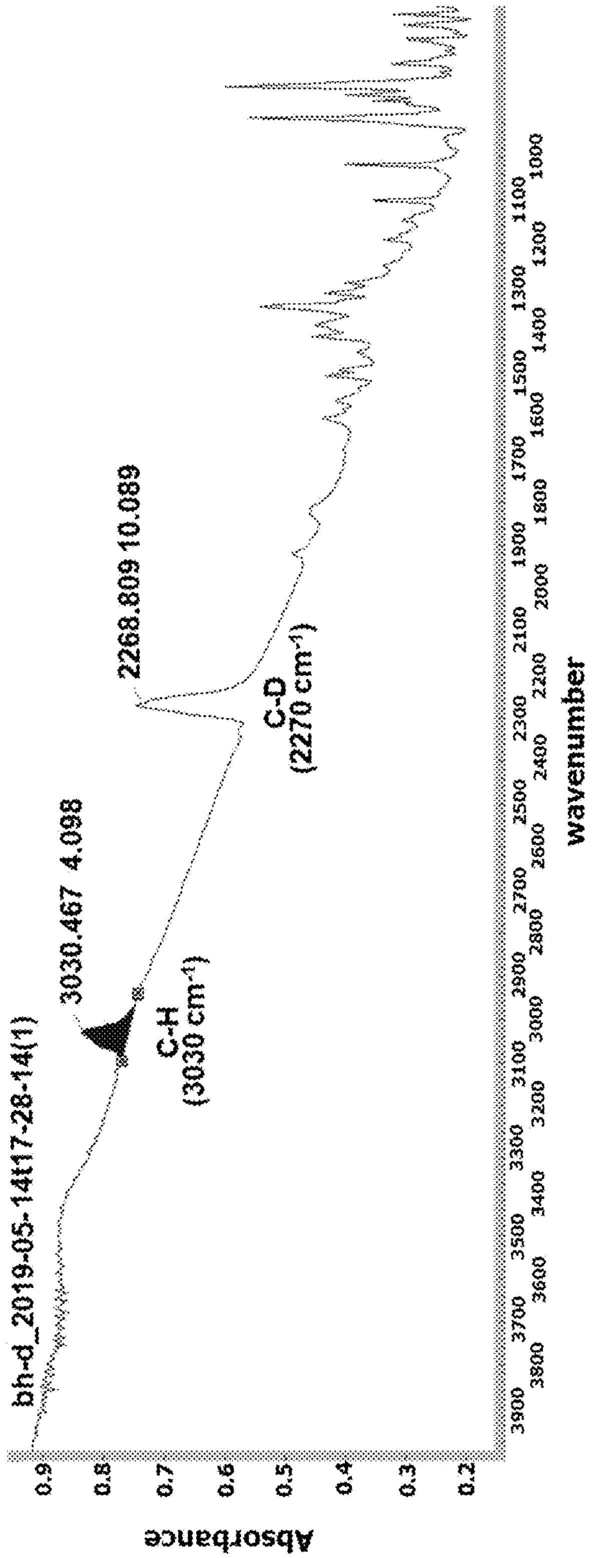

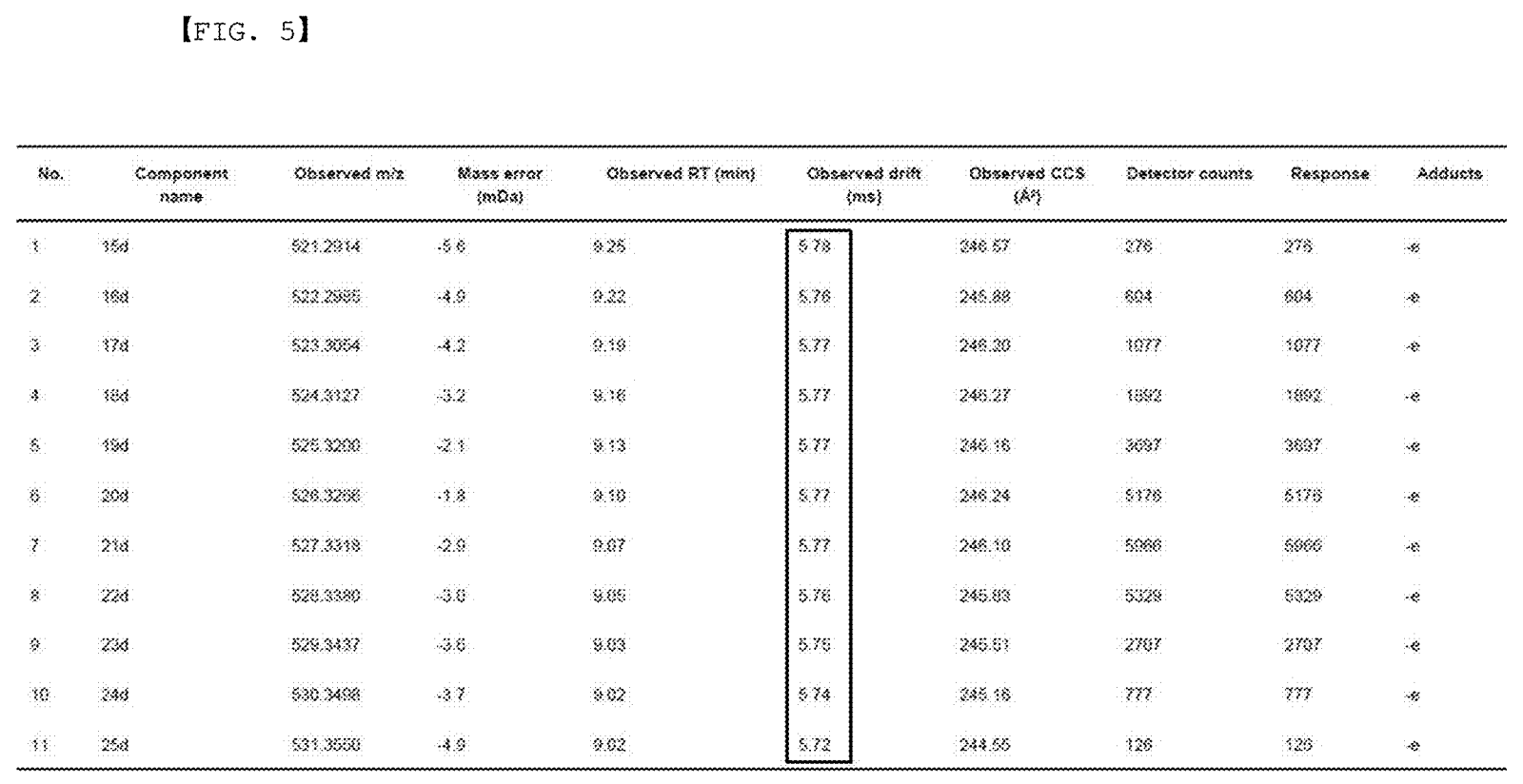

【FIG. 5】

| No. | Component name | Observed m/z | Mass error (mDa) | Observed RT (min) | Observed drift (ms) | Observed CCS (Å²) | Detector counts | Response | Adducts |
|---|---|---|---|---|---|---|---|---|---|
| 1 | 15d | 521.2914 | -5.6 | 9.25 | 5.78 | 246.57 | 276 | 276 | -e |
| 2 | 16d | 522.2985 | -4.9 | 9.22 | 5.76 | 245.88 | 604 | 604 | -e |
| 3 | 17d | 523.3054 | -4.2 | 9.19 | 5.77 | 246.30 | 1077 | 1077 | -e |
| 4 | 18d | 524.3127 | -3.2 | 9.16 | 5.77 | 246.27 | 1892 | 1892 | -e |
| 5 | 19d | 525.3200 | -2.1 | 9.13 | 5.77 | 246.16 | 3697 | 3697 | -e |
| 6 | 20d | 526.3268 | -1.8 | 9.10 | 5.77 | 246.24 | 5176 | 5175 | -e |
| 7 | 21d | 527.3318 | -2.9 | 9.07 | 5.77 | 246.10 | 5986 | 5966 | -e |
| 8 | 22d | 528.3380 | -3.0 | 9.05 | 5.76 | 245.83 | 5328 | 5329 | -e |
| 9 | 23d | 529.3437 | -3.6 | 9.03 | 5.76 | 245.51 | 2707 | 2707 | -e |
| 10 | 24d | 530.3498 | -3.7 | 9.02 | 5.74 | 245.16 | 777 | 777 | -e |
| 11 | 25d | 531.3550 | -4.9 | 9.02 | 5.72 | 244.55 | 126 | 125 | -e |

METHOD FOR ANALYZING DEUTERATED COMPOUNDS, METHOD FOR SELECTING DEUTERATED COMPOUND FOR MANUFACTURING DEVICE, AND METHOD FOR MANUFACTURING ELECTRONIC DEVICE

CROSS-REFERENCE TO RELATED APPLICATION(S)

The present application is a national stage entry under 35 U.S.C. § 371 of International Application No. PCT/KR2021/010127 filed on Aug. 3, 2021, which claims priority from Korean Patent Application No. 10-2020-0098125 filed on Aug. 5, 2020, all the disclosures of which are incorporated herein by reference.

TECHNICAL FIELD

The present specification relates to a method for analyzing a deuterated compound, a method for selecting a deuterated compound for manufacturing a device, and a method for manufacturing an organic light emitting device.

BACKGROUND ART

Compounds including deuterium are used for various purposes. For example, compounds including deuterium are widely used for drugs, pesticides, organic EL materials and other purposes as well as used as a labeling compound for identifying chemical reaction mechanisms or identifying metabolism.

A method of substituting an aromatic compound with deuterium to enhance a lifetime of an organic light emitting device (OLED) material is known. A principle of such an effect is that lifetime properties of an OLED material are enhanced as a C-D bond becomes to have a lower LUMO energy than a C—H bond.

A deuterated compound prepared through a deuteration reaction is prepared to a composition having two or more isotopes with different molecular weights depending on the number of deuterium substituted, and, since distribution depending on the substitution ratio of deuterium and the number of deuterium affects performance of a device manufactured therewith, analysis on the distribution depending on the substitution ratio of deuterium and the number of deuterium has been required.

DISCLOSURE

Technical Problem

The present specification is directed to providing a method for analyzing a deuterated compound, a method for selecting a deuterated compound for manufacturing a device, and a method for manufacturing an organic light emitting device.

Technical Solution

One embodiment of the present specification provides a method for analyzing a deuterated compound, the method including separating a sample including a deuterated compound by chromatography, and then deriving a mass chromatogram for each isotope having a different mass number obtained by a mass analysis;

calculating an isotope content for each mass number of the deuterated compound based on an area of the obtained mass chromatogram; and converting the calculated isotope content for each mass number to a substitution ratio by the number of deuterium through the following Equation 1.

$$\text{Substitution ratio by the number of deuterium (\%)} = \frac{\text{Isotope content for each mass number (\%)} \times \text{Number of deuterium}}{\text{Average number of deuterium substitution}} \quad \text{[Equation 1]}$$

$$\text{Average number of deuterium substitution} = \frac{\text{Sum of products of isotope content for each mass number (\%) and number of deuterium for each mass number}}{100} \quad \text{[Equation 2]}$$

In Equation 1 and Equation 2, the number of deuterium means the number of deuterium for each mass number of the isotope, and the average number of deuterium substitution is a value calculated from Equation 2.

In addition, one embodiment of the present specification provides a method for manufacturing an electronic device, the method including analyzing a deuterated compound using the above-described method; and manufacturing an electronic device using the analyzed deuterated compound.

In addition, one embodiment of the present specification provides a method for selecting a deuterated compound for manufacturing a device, the method including analyzing a deuterated compound using the above-described method;

evaluating a lifetime of a test device manufactured using the analyzed deuterated compound; and selecting the deuterated compound when the evaluated lifetime is greater than or equal to a reference value.

Advantageous Effects

According to an analysis method of a first embodiment of the present specification, a deuterium substitution ratio by the number of deuterium can be derived in a deuterated compound.

According to an analysis method of a second embodiment of the present specification, both a deuterium substitution ratio by the number of deuterium and an average deuterium substitution ratio can be derived in a deuterated compound.

According to an analysis method of a third embodiment of the present specification, a deuterated compound having a long lifetime can be selected based on the analyzed data.

DESCRIPTION OF DRAWINGS

FIG. 1 is a graph showing an isotope content for each mass number.

FIG. 2 is a graph showing a substitution ratio by the number of deuterium.

FIG. 3 is a graph showing substitution ratios by the number of deuterium of Materials A and B of Experimental Example 3.

FIG. 4 is a graph measuring FT-IR of a deuterated compound.

FIG. 5 is a table summarizing data obtained by measuring mobility of gaseous ions according to a 3D structure of a deuterated compound using HPLC/IM/TOF-MS.

MODE FOR DISCLOSURE

Hereinafter, the present specification will be described in detail.

One embodiment of the present specification provides a method for analyzing a deuterated compound, the method including separating a sample including a deuterated compound by chromatography, and then deriving a mass chromatogram for each isotope having a different mass number obtained by a mass analysis; calculating an isotope content for each mass number of the deuterated compound based on an area of the obtained mass chromatogram; and converting the calculated isotope content for each mass number to a substitution ratio by the number of deuterium through the following Equation 1.

$$\text{Substitution ratio by the number of deuterium (\%)} = \frac{\text{Isotope content for each mass number (\%)} \times \text{Number of deuterium}}{\text{Average number of deuterium substitution}} \quad \text{[Equation 1]}$$

$$\text{Average number of deuterium substitution} = \frac{\text{Sum of products of isotope content for each mass number (\%) and number of deuterium for each mass number}}{100} \quad \text{[Equation 2]}$$

In Equation 1 and Equation 2, the number of deuterium means the number of deuterium for each mass number of the isotope, and the average number of deuterium substitution is a value calculated from Equation 2.

Since a C-D bond becomes to have a lower LUMO energy than a C—H bond, a device using a deuterium-substituted compound has enhanced lifetime properties.

A deuterated compound prepared through a deuteration reaction is prepared to a composition having two or more isotopes with different molecular weights depending on the number of deuterium substituted, and a lifetime of a device using the same varies depending on how the deuterium is substituted in the prepared composition.

In a deuterated compound, an average deuterium substitution ratio is generally calculated through nuclear magnetic resonance (NMR).

It is found that, among deuterated compounds having the same average deuterium substitution ratio, there is a difference in the lifetime of a device using the same. Furthermore, it is identified that, even with the same average deuterium substitution ratio, there is a difference in the lifetime of a device using the same depending on a substitution ratio by the number of deuterium.

However, through nuclear magnetic resonance, there is a limit in deriving deuterium substitution ratio distribution depending on the number of deuterium substitution.

Accordingly, the present specification provides an analysis method on distribution depending on a substitution ratio by the number of deuterium and the number of deuterium. Specifically, the present specification establishes a method of, using chromatography and mass spectrum, detecting a molecular weight depending on the number of deuterium substitution of a deuterium-substituted compound, and analyzing a substitution ratio by the number of deuterium based on the detected data. Furthermore, the present specification proves a correlation between an average deuterium substitution ratio and a result of evaluating a lifetime of a device manufactured using the deuterium-substituted compound.

According to an analysis method of a first embodiment of the present specification, a deuterium substitution ratio by the number of deuterium may be derived in a deuterated compound.

According to an analysis method of a second embodiment of the present specification, both a deuterium substitution ratio by the number of deuterium and an average deuterium substitution ratio may be derived in a deuterated compound.

According to an analysis method of a third embodiment of the present specification, a deuterated compound having a long lifetime may be selected based on the analyzed data.

The method for analyzing a deuterated compound of the present specification includes separating a sample including a deuterated compound by chromatography, and then deriving a mass chromatogram for each isotope having a different mass number obtained by a mass analysis.

In one embodiment of the present specification, the deriving of a mass chromatogram for each isotope may include, separating a sample including a deuterated compound by chromatography, and then mass analyzing the result;

deriving each mass spectrum for each isotope having a different mass number from a total ion chromatogram obtained by the mass analysis; and deriving an individual mass chromatogram of an isotope having a different mass number from the obtained mass spectrum.

In one embodiment of the present specification, the chromatography may be liquid chromatography, and may preferably be high performance liquid chromatography. Specifically, a deuterated compound subject to the analysis has a large molecular weight, and is preferably separated through liquid chromatography.

In one embodiment of the present specification, the sample including a deuterated compound further includes a diluent solvent. The diluent solvent is not particularly limited as long as it is capable of dissolving the deuterated compound, and may be selected from among diluent solvents used in the art. For example, the diluent solvent may be tetrahydrofuran (THF).

In one embodiment of the present specification, in the sample including a deuterated compound, the deuterated compound may have a concentration of greater than or equal to 0.1 mg/mL and less than or equal to 0.5 mg/mL. This may result in a chromatogram with favorable sensitivity.

When separating the deuterated compound by chromatography, a source temperature of the chromatography may be maintained at 100° C. to 150° C. This has an advantage of obtaining a best signal or signal-to-noise ratio.

From the total ion chromatogram (TIC) obtained by the mass analysis, an extracted ion chromatogram (EIC), which is a mass spectrum for each isotope having a different mass number, is derived. For example, when the total ion chromatogram obtained by the mass analysis distributes from 448 m/z to 453 m/z, an extracted ion chromatograms is derived for each of 448 m/z, 449 m/z, 450 m/z, 451 m/z, 452 m/z and 453 m/z.

In one embodiment of the present specification, the deuterated compound may be an aromatic compound. The aromatic compound is an aromatic compound having one or more aromatic rings, and is specifically an aromatic compound including 1 or more and 30 or less aromatic rings. Herein, having one or more aromatic rings may mean having one or more aromatic rings of monocyclic, polycyclic or a combination thereof, or having one or more basic unit aromatic rings (for example: benzene ring). For example, an anthracene ring may mean one aromatic ring, or may mean, based on a benzene ring that is a basic unit, a ring obtained by linking three benzene rings.

In one embodiment of the present specification, the deuterated compound may be an aromatic compound having 10 to 60 carbon atoms. The deuterated compound may be a hydrocarbon aromatic compound substituted or unsubstituted and having 10 to 60 carbon atoms, a hydrocarbon aromatic compound substituted or unsubstituted and having 10 to 30 carbon atoms, or a hydrocarbon aromatic compound substituted or unsubstituted and having 10 to 20 carbon atoms. When the hydrocarbon aromatic compound is substituted, the hydrocarbon aromatic compound may be substituted with a group selected from the group consisting of a substituted or unsubstituted aryl group; and a substituted or unsubstituted heteroaryl group.

In one embodiment of the present specification, the deuterated compound may be substituted or unsubstituted anthracene. When the anthracene is substituted, the anthracene may be substituted with a group selected from the group consisting of a substituted or unsubstituted aryl group; and a substituted or unsubstituted heteroaryl group.

In one embodiment of the present specification, the deuterated compound may be a heteroaromatic compound having 8 to 60 carbon atoms. The deuterated compound may be a heteroaromatic compound substituted or unsubstituted and having 8 to 60 carbon atoms, a heteroaromatic compound substituted or unsubstituted and having 8 to 30 carbon atoms, or a heteroaromatic compound substituted or unsubstituted and having 8 to 20 carbon atoms. When the heteroaromatic compound is substituted, the heteroaromatic compound may be substituted with a group selected from the group consisting of a substituted or unsubstituted aryl group; and a substituted or unsubstituted heteroaryl group.

In one embodiment of the present specification, the deuterated compound may be substituted or unsubstituted carbazole, substituted or unsubstituted dibenzofuran, or substituted or unsubstituted dibenzothiophene, and may further have an adjacent group-bonding fused ring.

The term "substitution" means a hydrogen atom bonding to a carbon atom of a compound being changed to another substituent, and the position of substitution is not limited as long as it is a position at which the hydrogen atom is substituted, that is, a position at which a substituent is capable of substituting, and when two or more substituents substitute, the two or more substituents may be the same as or different from each other.

In the present specification, the term "substituted or unsubstituted" means being substituted with one, two or more substituents selected from the group consisting of a halogen group; an amine group; an alkoxy group; an alkyl group; a cycloalkyl group; an aryl group; and a heterocyclic group, or being substituted with a substituent linking two or more substituents among the substituents illustrated above, or having no substituents. For example, the "substituent linking two or more substituents" may be a biphenyl group. In other words, a biphenyl group may be an aryl group, or may be interpreted as a substituent linking two phenyl groups.

In the present specification, examples of the halogen group may include fluorine (—F), chlorine (—Cl), bromine (—Br) or iodine (—I).

In the present specification, the alkyl group may be linear or branched, and although not particularly limited thereto, the number of carbon atoms is preferably from 1 to 60. According to one embodiment, the number of carbon atoms of the alkyl group is from 1 to 30. According to another embodiment, the number of carbon atoms of the alkyl group is from 1 to 20. According to another embodiment, the number of carbon atoms of the alkyl group is from 1 to 10. Specific examples of the alkyl group may include a methyl group, an ethyl group, a propyl group, an n-propyl group, an isopropyl group, a butyl group, an n-butyl group, an isobutyl group, a tert-butyl group, a pentyl group, an n-pentyl group, a hexyl group, an n-hexyl group, a heptyl group, an n-heptyl group, an octyl group, an n-octyl group and the like, but are not limited thereto.

In the present specification, the alkoxy group may be linear, branched or cyclic. The number of carbon atoms of the alkoxy group is not particularly limited, but is preferably from 1 to 20. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy and the like, but are not limited thereto.

Substituents including the alkyl group, the alkoxy group and other alkyl group parts described in the present specification include all of linear or branched forms.

In the present specification, the cycloalkyl group is not particularly limited, but preferably has 3 to 60 carbon atoms, and according to one embodiment, the number of carbon atoms of the cycloalkyl group is from 3 to 30. According to another embodiment, the number of carbon atoms of the cycloalkyl group is from 3 to 20. According to another embodiment, the number of carbon atoms of the cycloalkyl group is from 3 to 6. Specific examples thereof may include a cyclopropyl group, a cyclobutyl group, a cyclopentyl group, a cyclohexyl group, a cycloheptyl group, a cyclooctyl group and the like, but are not limited thereto.

In the present specification, the aryl group is not particularly limited, but preferably has 6 to 60 carbon atoms, and may be a monocyclic aryl group or a polycyclic aryl group. According to one embodiment, the number of carbon atoms of the aryl group is from 6 to 39. According to one embodiment, the number of carbon atoms of the aryl group is from 6 to 30. When the aryl group is a monocyclic aryl group, examples thereof may include a phenyl group, a biphenyl group, a terphenyl group, a quarterphenyl group and the like, but are not limited thereto. When the aryl group is a polycyclic aryl group, examples thereof may include a naphthyl group, an anthracenyl group, a phenanthryl group, a pyrenyl group, a perylenyl group, a triphenyl group, a chrysenyl group, a fluorenyl group, a triphenylenyl group and the like, but are not limited thereto.

In the present specification, the fluorene group may be substituted, and two substituents may bond to each other to form a spiro structure.

When the fluorene group is substituted, a spirofluorene group such as

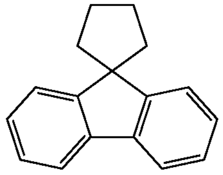 [SMILES: c1ccc2c(c1)-c1ccccc1C21CCCC1]

and

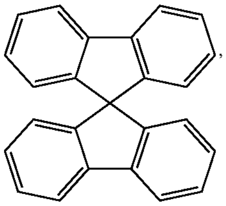 [SMILES: c1ccc2c(c1)-c1ccccc1C21c2ccccc2-c2ccccc21]
, a substituted fluorene group such as

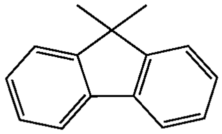

(9,9-dimethylfluorene group) and

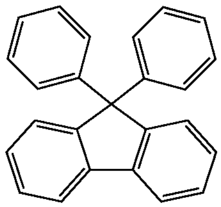 [SMILES: c1ccc(C2(c3ccccc3)c3ccccc3-c3ccccc32)cc1]

(9,9-diphenylfluorene group) may be included, however, the structure is not limited thereto.

In the present specification, the heterocyclic group is a cyclic group including one or more of N, O, P, S, Si and Se as a heteroatom, and although not particularly limited thereto, the number of carbon atoms is preferably from 2 to 60. According to one embodiment, the number of carbon atoms of the heterocyclic group is from 2 to 36. Examples of the heterocyclic group may include a pyridine group, a pyrrole group, a pyrimidine group, a quinoline group, a pyridazine group, a furan group, a thiophene group, an imidazole group, a pyrazole group, a dibenzofuran group, a dibenzothiophene group, a carbazole group, a benzocarbazole group, a benzonaphthofuran group, a benzonaphthothiophene group, an indenocarbazole group, an indolocarbazole group and the like, but are not limited thereto.

In the present specification, the descriptions on the heterocyclic group provided above may be applied to the heteroaryl group except for being aromatic.

In the present specification, the amine group may be selected from the group consisting of $—NH_2$; an alkylamine group; an N-alkylarylamine group; an arylamine group; an N-arylheteroarylamine group; an N-alkylheteroarylamine group and a heteroarylamine group, and although not particularly limited thereto, the number of carbon atoms is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, an N-phenylnaphthylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenylterphenylamine group, an N-phenanthrenylfluorenylamine group, an N-biphenylfluorenylamine group and the like, but are not limited thereto.

In the present specification, the N-alkylarylamine group means an amine group in which N of the amine group is substituted with an alkyl group and an aryl group.

In the present specification, the N-arylheteroarylamine group means an amine group in which N of the amine group is substituted with an aryl group and a heteroaryl group.

In the present specification, the N-alkylheteroarylamine group means an amine group in which N of the amine group is substituted with an alkyl group and a heteroaryl group.

In the present specification, the alkyl group, the aryl group and the heteroaryl group in the alkylamine group; the N-alkylarylamine group; the arylamine group; the N-arylheteroarylamine group; the N-alkylheteroarylamine group and the heteroarylamine group are the same as the examples of the alkyl group, the aryl group and the heteroaryl group described above.

The method for analyzing a deuterated compound of the present specification includes calculating an isotope content for each mass number of the deuterated compound based on an area of the obtained mass chromatogram.

An area of the extracted ion chromatogram for each isotope having a different mass number is obtained, and a percentage of the area of the ion chromatogram calculated based on a total area of the total ion chromatogram obtained by the mass analysis is an isotope content for each mass number of the deuterated compound.

Based on the deuterated compound that is a subject of the analysis, isotope molecular weights depending on the number of deuterium substituted are identified, and the identified isotope molecular weights depending on the number of deuterium are matched to the mass number (m/z) of the extracted ion chromatogram. Information of the extracted ion chromatogram of the matched mass number is matched to information depending on the number of deuterium substituted.

For example, when a deuterated compound having 22 deuterium has a molecular weight (M+H) of approximately 453, a percentage of the area of the extracted ion chromatogram with a mass number of 453 m/z based on the total area of the total ion chromatogram is an isotope content for each mass number of the deuterated compound having 22 deuterium.

The method for analyzing a deuterated compound of the present specification includes converting the calculated isotope content for each mass number to a substitution ratio by the number of deuterium through the following Equation 1.

$$\text{Substitution ratio by the number of deuterium (\%)} = \frac{\text{Isotope content for each mass number (\%)} \times \text{Number of deuterium}}{\text{Average number of deuterium substitution}} \quad \text{[Equation 1]}$$

$$\text{Average number of deuterium substitution} = \frac{\text{Sum of products of isotope content for each mass number (\%) and number of deuterium for each mass number}}{100} \quad \text{[Equation 2]}$$

In Equation 1 and Equation 2, the number of deuterium means the number of deuterium for each mass number of the isotope, and the average number of deuterium substitution is a value calculated from Equation 2.

Equation 2 means a sum of products of the isotope content for each mass number that mass appears in the total ion chromatogram and the number of deuterium corresponding thereto.

The method for analyzing a deuterated compound of the present specification may further include calculating an average deuterium substitution ratio through the following Equation 3.

[Equation 3]

$$\text{Average deuterium substitution ratio (\%)} = \frac{\text{Average number of deuterium substitution}}{\text{Number of hydrogen} + \text{Number of deuterium}} \times 100$$

In Equation 3, the number of hydrogen and the number of deuterium mean the number of hydrogen and the number of deuterium in one molecule.

The method for analyzing a deuterated compound of the present specification may further include evaluating a lifetime of a test device manufactured using the deuterated compound having the substitution ratio by the number of deuterium analyzed.

The test device is a device manufactured for selecting the deuterated compound and is not particularly limited as long as a lifetime for comparison may be measured, and may be manufactured to have constitutions of a device used in the art.

According to one embodiment of the present specification, a device lifetime is evaluated by applying a voltage to the test device including a deuterium-substituted material, and then measuring a time for luminance to decrease.

According to one embodiment of the present specification, the lifetime evaluated as above is compared with a lifetime of a device using any compound that does not go through a deuterium substitution reaction. Specifically, a ratio of the lifetime evaluated with the deuterated compound is derived when a lifetime of a device using any compound that does not go through a deuterium substitution reaction is employed as 100%. Preferably, a ratio of the lifetime evaluated with the deuterated compound is derived when a lifetime of a device using a compound prior to the deuteration reaction of the deuterated compound subject to measurement is employed as 100%.

The method for analyzing a deuterated compound of the present specification may further include selecting the deuterated compound when the evaluated lifetime is greater than or equal to a reference value.

The reference value is a lifetime of a device using any compound that does not go through a deuterium substitution reaction, and is preferably a lifetime of a device using a compound prior to the deuteration reaction to get the deuterated compound subject to measurement.

When a lifetime of a device using any compound that does not go through a deuterium substitution reaction is 100%, the reference value may be 110% or greater, 120% or greater or 130% or greater.

In addition, one embodiment of the present specification provides a method for selecting a deuterated compound for manufacturing a device, the method including analyzing a deuterated compound using the above-described method; evaluating a lifetime of a test device manufactured using the analyzed deuterated compound; and selecting the deuterated compound when the evaluated lifetime is greater than or equal to a reference value.

The method for selecting a deuterated compound for manufacturing a device may cite the descriptions on the method for analyzing a deuterated compound, and repeated descriptions will not be included.

One embodiment of the present specification provides a method for manufacturing an electronic device, the method including analyzing a deuterated compound using the above-described method; and manufacturing an electronic device using the analyzed deuterated compound.

The method for manufacturing an electronic device may cite the descriptions on the method for analyzing a deuterated compound, and repeated descriptions will not be included.

The electronic device is not particularly limited as long as it is a device capable of using a deuterated compound, and examples thereof may include an organic light emitting device, an organic phosphorescent device, and organic solar cell, an organic photo conductor, an organic transistor and the like.

The electronic device includes a first electrode; a second electrode provided opposite to the first electrode; and one or more organic material layers provided between the first electrode and the second electrode, wherein one or more layers of the organic material layers may include the selected deuterated compound.

When the electronic device is an organic light emitting device, the organic material layer includes a light emitting layer, and the light emitting layer may include the selected deuterated compound. Furthermore, the light emitting layer may include the selected deuterated compound as a host.

When the electronic device is an organic light emitting device, the organic light emitting device may have a structure further including a layer selected from among a hole injection layer, a hole transfer layer, a light emitting layer, an electron transfer layer, an electron injection layer and the like as the organic material layer.

The selected deuterated compound may also be used in an electronic device including an organic phosphorescent device, an organic solar cell, an organic photo conductor, an organic transistor and the like under a similar principle used in the organic light emitting device. For example, the organic solar cell may have a structure including an anode, a cathode and a photoactive layer provided between the anode and the cathode, wherein the photoactive layer may include the selected deuterated compound.

Hereinafter, the present specification will be described in more detail with reference to examples. However, the following examples are for illustrative purposes only, and not for limiting the present specification.

Experimental Example 1

Compound 1 having the following structure was deuterated, then obtained, and measured using each of measurement methods of the following Table 1. Information relating to substituted deuterium was identified by analyzing the measured results, and the results are shown in Table 1.

[Compound 1]

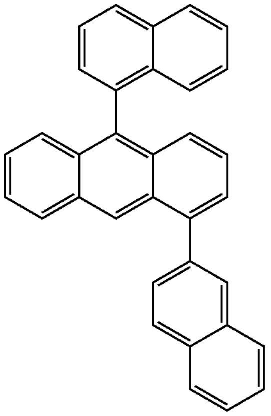

In the following Table 1, HPLC/IM/TOF-MS (high performance liquid chromatography/ion mobility/time-of-flight/mass spectrometer) was measured under the following condition.

| | |
|---|---|
| Corona(uA) | 10~25 |
| Source Temperature (° C.) | 100~150 |
| Desolvation Temperature (° C.) | 450~650 |
| Cone Gas Flow (L/hr) | 30~100 |
| Desolvation Gas Flow (L/hr) | 500~1000 |
| Scan time | 0.5~1.0 s |
| Start Mass | 100 |
| End Mass | 1000 |

NMR (nuclear magnetic resonance) was measured under the following condition.

| NMR | |
|---|---|
| Solvent | THF-$d_8$ |
| Temperature | 298K |
| Method | 1D normal (H) |

The sample to measure (3 mg) was pulverized together with KBr (100 mg), and then inserted to a disk manufacturing kit. Then, a specimen disk was manufactured using a pressurizing press, and FT-IR (Fourier transform infrared spectroscopy) measurement was conducted thereon. Herein, the sample holder and the detector unit cell were purged with nitrogen ($N_2$ purging) for 30 minutes for stabilization, and the measurement was made under the following condition in a transmittance mode.

Wavenumber: 400 $cm^{-1}$ to 4000 $cm^{-1}$

Number of scan: 32

Resolution: 4 $cm^{-1}$

TABLE 1

| Category | Measurement Method | Average Deuterium Substitution Ratio | Substitution Ratio by the Number of Deuterium |
|---|---|---|---|
| Comparative Example 1 | HPLC/IMS/TOF-MS | — | Unable to Detect |
| Comparative Example 2 | FT-IR | 76% | Unable to Detect |
| Comparative Example 3 | NMR | 76% | Unable to Detect |

When measuring mobility (drift time) of gaseous ions according to the 3D structure of deuterated Compound 1 using HPLC/IM/TOF-MS as in Comparative Example 1, data as in FIG. 5 were obtained. As shown in FIG. 5, there was no difference in the mobility for each ion, and the substitution ratio by the number of deuterium was not able to be obtained. When measuring deuterated Compound 1 using FT-IR as in Comparative Example 2, a graph as in FIG. 4 was obtained, and an average deuterium substitution ratio of 76% was able to be derived therefrom, however, the substitution ratio by the number of deuterium was not able to be obtained.

When measuring deuterated Compound 1 using NMR as in Comparative Example 3, an average deuterium substitution ratio of 76% was identified, however, the substitution ratio by the number of deuterium was not able to be obtained.

Experimental Example 2

Compound 1 was deuterated using a method different from Experimental Example 1, then obtained. The deuterium-substituted compound was dissolved in THF (0.2 mg/mL), and then analyzed using HPLC/MS under the following condition.

| HPLC/UV | |
|---|---|
| Mobile phase | A: Acetonitrile/Tetrahydrofuran (constant ratio)<br>B: Water |
| Run time | 10 min |
| Injection volume | 1~10 μL |
| Detector | PDA detector |

| HPLC-APCI/MS | |
|---|---|
| Capillary | 10~20 kV |
| Cone voltage | 30~70 V |
| Source temperature | 100~150° C. |
| Cone gas flow | 50~200 L/hr |

A percentage of the area for each mass number of the extracted ion chromatogram based on the total area of the total ion chromatogram is shown as an isotope content for each mass number (%) in the following Table 2 and FIG. 1.

TABLE 2

| Number of Deuterium | 17 | 18 | 19 | 20 | 21 | 22 |
|---|---|---|---|---|---|---|
| Number of Hydrogen | 5 | 4 | 3 | 2 | 1 | 0 |
| m + H (m/z) | 448 | 449 | 450 | 451 | 452 | 453 |
| Isotope Content for Each Mass Number (%) | 4.8 | 13.2 | 20.3 | 26.2 | 21.1 | 14.4 |
| Substitution Ratio by the Number of Deuterium (%) | 4.1 | 11.9 | 19.4 | 26.3 | 22.3 | 15.9 |
| Average Deuterium Substitution Ratio (%) | | | 90.4 | | | |

The average number of deuterium substitution calculated from the information of Table 2 is 19.9, and this is a value calculated from $\{(17\times4.8)+(18\times13.2)+(19\times20.3)+(20\times26.2)+(21\times21.1)+(22\times14.4)\}/100$ according to Equation 2. The substitution ratio by the number of deuterium calculated from the information of Table 2 is a value calculated according to Equation 1. When taking the case in which the mass number is 448 m/z as an example, the value is calculated as 4.1% based on 4.8%×17/19.9.

Experimental Example 3

Material A and Material B obtained by deuterating Compound 2 having the following structure using different methods were analyzed using HPLC/MS under the same condition as in Experimental Example 1, and the results are shown in the following Table 3.

[Compound 2]

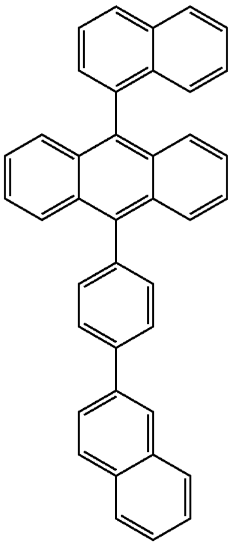

When the lifetime of the device using Compound 2 before deuterium substitution is employed as 100%, the lifetime of the device using each of deuterated Material A and Material B was calculated as a percentage, and the results are shown in the device evaluation results of the following Table 3.

The device evaluation herein shows how slowly the luminance of the device manufactured with each of Material A and Material B using the same method decreases as a percentage based on when the lifetime of the device manufactured using the material not substituted with deuterium is employed as 100%.

For example, the result of 136% obtained in the device evaluation result of Material B of Table 3 shows the time taken for L/Lo of the device manufactured with Material B using the same method to become 95% as a percentage based on when the time taken for L/Lo of the device manufactured using a material not substituted with deuterium to become 95% is employed as 100%. Herein, Lo is initial luminance, and L is real-time luminance depending on the driving time of the device.

Herein, the device for the lifetime test was manufactured in the following order, and the compounds before/after deuterium substitution were used as a light emitting layer host.

1) Remove residual organic materials in a vacuum chamber.
2) Introduce approximately 1 g of each organic material to deposit to a crucible inside the vacuum chamber, and the vacuum chamber was under vacuum of $10^{-6}$ torr to $10^{-5}$ torr for a day.
3) Introduce an ITO (indium tin oxide) substrate into the vacuum chamber, and the organic material suitable for each layer was deposited while moving the ITO substrate to obtain an organic material layer. Herein, each layer was deposited to a thickness capable of obtaining favorable device efficiency.
4) Deposit Al (cathode) on the organic material layer to manufacture an organic light emitting device.
5) In the vacuum chamber, conduct encapsulation using epoxy, and take out the result from the vacuum chamber.

TABLE 3

| | | Material A | | Material B | |
|---|---|---|---|---|---|
| | | HPLC Area (%) | Substitution ratio by Number of Deuterium (%) | HPLC Area (%) | Substitution ratio by Number of Deuterium (%) |
| Number of Deuterium Substitution | 18 | 0.5 | 0.4 | 0.5 | 0.4 |
| | 19 | 1.4 | 1.2 | 1.4 | 1.2 |
| | 20 | 3.3 | 2.9 | 3.2 | 2.8 |
| | 21 | 11.7 | 10.7 | 9.6 | 8.7 |
| | 22 | 14.9 | 14.2 | 14.7 | 14.0 |
| | 23 | 34.8 | 34.8 | 30.3 | 30.2 |
| | 24 | 13.4 | 14.0 | 20.9 | 21.7 |
| | 25 | 17.7 | 19.2 | 17.2 | 18.6 |
| | 26 | 2.4 | 2.7 | 2.2 | 2.5 |
| Total Substitution ratio (%) | | | 89% | | 89% |
| Device Evaluation Result | | | 131% | | 136% |

* Values Using Equation 1

Herein, HPLC Area (%) in Table 3 means an isotope content for each mass number.

According to Table 3, the average deuterium substitution ratio was the same at 89%, however, in the device evaluation results on Material A and Material B having a different substitution ratio by the number of deuterium, it was identified that favorable device evaluation results were obtained as the sum of the substitution ratios by the number of deuterium corresponding to the number of deuterium of 23 to 26 was larger.

Through this, necessity and importance of analyzing a substitution ratio by the number of deuterium were identified.

Herein, even when a deuteration reaction was performed on the same compound, the average deuterium substitution ratio and/or the substitution ratio by the number of deuterium may vary by varying factors such as a deuterium source type, a deuterium source content, an organic solvent type, an organic solvent amount, a reaction time, a reaction temperature and a catalyst type.

Factors varied to analyze the difference in the deuterium substitution ratio in the present specification are the content of benzene-d6, the content of organic solvent participating in the reaction, the number of benzene-d6 reuse and/or the ratio of benzene-d6 amount before/after reuse in the deuteration reaction.

The invention claimed is:

1. A method for manufacturing an electronic device, the method comprising:

separating a sample including a deuterated compound by chromatography, and then deriving a mass chromatogram for each isotope having a different mass number obtained by a mass analysis;

calculating an isotope content for each mass number of the deuterated compound based on an area of the obtained mass chromatogram;

converting the calculated isotope content for the each mass number to a substitution ratio by the number of deuterium through Equation 1;

evaluating a lifetime of a test device manufactured using the deuterated compound having the substitution ratio by the number of deuterium analyzed; and manufacturing an electronic device by including the deuterated compound having the evaluated lifetime greater than or equal to a reference value in one or more organic material layers, $$\text{Substitution ratio by the number of deuterium (\%)} = \frac{\text{Isotope content for each mass number (\%)} \times \text{Number of deuterium}}{\text{Average number of deuterium substitution}} \quad \text{[Equation 1]}$$

$$\text{Average number of deuterium substitution} = \frac{\text{Sum of products of isotope content for each mass number (\%) and number of deuterium for each mass number}}{100} \quad \text{[Equation 2]}$$

wherein, in Equation 1 and Equation 2, the number of deuterium means the number of deuterium for the each mass number of the deuterated compound; and the average number of deuterium substitution is a value calculated from Equation 2.

2. The method of claim 1, further comprising calculating an average deuterium substitution ratio through the following Equation 3:

$$\text{Average deuterium substitution ratio (\%)} = \frac{\text{Average number of deuterium substitution}}{\text{Number of hydrogen} + \text{Number of deuterium}} \times 100 \quad \text{[Equation 3]}$$

wherein, in Equation 3, the number of hydrogen and the number of deuterium mean the number of hydrogen and the number of deuterium in the deuterated compound.

3. The method of claim 1, wherein the chromatography is high performance liquid chromatography.

4. The method of claim 1, wherein the deuterated compound is an aromatic compound having 10 to 60 carbon atoms.

5. The method of claim 1, wherein the deuterated compound is selected for manufacturing a device when the evaluated lifetime is 110% or greater relative to the reference value.

6. The method of claim 1, wherein the deuterated compound is selected for manufacturing a device when the evaluated lifetime is 120% or greater relative to the reference value.

7. The method of claim 1, wherein the deuterated compound is selected for manufacturing a device when the evaluated lifetime is 130% or greater relative to the reference value.

* * * * *